(12) United States Patent
Wang et al.

(10) Patent No.: US 12,129,118 B2
(45) Date of Patent: Oct. 29, 2024

(54) DELIVERY SITE AND DELIVERY METHOD

(71) Applicant: BEIJING JINGDONG QIANSHI TECHNOLOGY CO., LTD., Beijing (CN)

(72) Inventors: Zhao Wang, Beijing (CN); Jun Xiao, Beijing (CN); Yafang Zhang, Beijing (CN); Ying Chen, Beijing (CN); Jian Zhang, Beijing (CN); Qiang Zhang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 860 days.

(21) Appl. No.: 17/275,942

(22) PCT Filed: Aug. 12, 2019

(86) PCT No.: PCT/CN2019/100256
§ 371 (c)(1),
(2) Date: Mar. 12, 2021

(87) PCT Pub. No.: WO2020/057293
PCT Pub. Date: Mar. 26, 2020

(65) Prior Publication Data
US 2021/0284450 A1    Sep. 16, 2021

(30) Foreign Application Priority Data

Sep. 21, 2018   (CN) .......................... 201811106610.4

(51) Int. Cl.
*B65G 1/137* (2006.01)
*B64F 1/00* (2024.01)
(Continued)

(52) U.S. Cl.
CPC ............ *B65G 1/1373* (2013.01); *B64F 1/005* (2013.01); *B64F 1/222* (2013.01); *B64F 1/32* (2013.01);
(Continued)

(58) Field of Classification Search
CPC . B64F 1/005; B64F 1/222; B64F 1/32; B65G 1/0435; B65G 1/1373; B65G 2814/0398
See application file for complete search history.

(56) References Cited

U.S. PATENT DOCUMENTS 6,745,102 B1    6/2004  Liu
11,312,573 B2   4/2022  Schedlbauer et al.
(Continued)

FOREIGN PATENT DOCUMENTS

CN    107600861 A    1/2018
CN    108163199 A    6/2018
(Continued)

OTHER PUBLICATIONS

International Search Report and Written Opinion issued Oct. 17, 2019 in PCT/CN2019/100256 (with English Translation), citing documents AA, AO and AP therein, 14 pages.

(Continued)

*Primary Examiner* — Saul Rodriguez
*Assistant Examiner* — Ashley K Romano
(74) *Attorney, Agent, or Firm* — Oblon, McClelland, Maier & Neustadt, L.L.P.

(57) ABSTRACT

A delivery site and delivery method are provided, the delivery site includes: a building having a storage space configured to store an article and a drone apron configured to allow a drone to land thereon, an article receiving device at least partially arranged in the building and configured to receive an article unloaded from the drone on the drone apron, and an article sorting device arranged in the building, (Continued)

and configured to sort a received article into the storage space.

19 Claims, 3 Drawing Sheets

(51) Int. Cl.
    *B64F 1/222*     (2024.01)
    *B64F 1/32*     (2006.01)
    *B65G 1/04*     (2006.01)

(52) U.S. Cl.
    CPC .... *B65G 1/0435* (2013.01); *B65G 2814/0398* (2013.01)

(56) References Cited

U.S. PATENT DOCUMENTS

| | | |
|---|---|---|
| 2017/0175413 A1 | 6/2017 | Curlander et al. |
| 2018/0022551 A1 | 1/2018 | Gonduh et al. |
| 2018/0105289 A1 | 4/2018 | Walsh et al. |
| 2018/0203465 A1* | 7/2018 | Suzuki .................... B64C 13/20 |
| 2018/0265222 A1* | 9/2018 | Takagi ................. G05D 1/0676 |
| 2018/0265296 A1* | 9/2018 | Beckman ........... G06Q 30/0202 |
| 2018/0277000 A1* | 9/2018 | Uesugi ............... H04B 7/18504 |
| 2018/0330313 A1* | 11/2018 | Clarke ................. G06Q 10/083 |
| 2018/0352988 A1* | 12/2018 | Ortiz ....................... E05B 65/06 |
| 2018/0362187 A1* | 12/2018 | Pruski ...................... B64D 9/00 |
| 2020/0002094 A1 | 1/2020 | Schedlbauer et al. |
| 2020/0079530 A1 | 3/2020 | Walsh et al. |
| 2021/0339887 A1 | 11/2021 | Walsh et al. |

FOREIGN PATENT DOCUMENTS

| | | |
|---|---|---|
| CN | 207698534 U | 8/2018 |
| JP | 60-187130 U | 12/1985 |
| JP | 2004-123240 A | 4/2004 |
| JP | 2018-122997 A | 8/2018 |
| WO | WO 2018/112490 A2 | 6/2018 |

OTHER PUBLICATIONS

Extended European Search Report issued Apr. 4, 2022 in European Patent Application No. 19862120.3, citing documents AA through AC and AO therein, 9 pages.

Japanese Office Action issued Oct. 2, 2023 in Japanese Application 2021-514397, (with English translation), citing documents 1 & 15-16 therein, 18 pages.

Decision to Grant a Patent issued in Japanese Patent Application No. 2021-514397 on Apr. 30, 2024, (w/ English Translation), citing doucment 15 threin.

* cited by examiner

DELIVERY SITE AND DELIVERY METHOD

CROSS-REFERENCE TO RELATED APPLICATIONS

The present application is a U.S. National Stage Application under 35 U.S.C. § 371 of International Patent Application No. PCT/CN2019/100256, filed on Aug. 12, 2019, which is based on and claims priority to China Patent Application No. 201811106610.4 filed on Sep. 21, 2018, the disclosure of both of which are incorporated by reference herein in their entirety.

TECHNICAL FIELD

The present disclosure relates to the field of logistics, and in particular to a delivery site and a delivery method.

BACKGROUND

During the distribution and automated storage of an article, logistics is a process of realizing the demands of users by an organic combination of basic functions such as transport, storage, loading and unloading, handling, distribution, and information processing according to actual requirements during the physical flow of article from a supplying place to a receiving place. Logistics plays a very important role in modern business.

In the field of logistics, warehouse transfer and article pickup are very important links. The costs of these links account for a large proportion of the entire logistics cost, so that it is always a direction of research and development in the industry to make technical optimizations to such links. The delivery sites in the related art are generally a plurality of network sites established in cities, and each network site is deployed with relevant staff so that labor is used for transferring an article or helping clients to pick up an article.

SUMMARY

In one aspect of the present disclosure, a delivery site is provided. The delivery site includes: a building having a storage space configured to store an article and a drone apron configured to allow a drone to land thereon; an article receiving device at least partially arranged in the building and configured to receive an article unloaded from the drone on the drone apron; and an article sorting device arranged in the building, and configured to sort a received article into the storage space.

In some embodiments, the delivery site further includes: a first adjusting mechanism arranged on the drone apron and configured to adjust a position of the drone landing on the drone apron, or to adjust an article unloaded from the drone to a position where the article receiving device receives the article.

In some embodiments, the drone apron is located on a top of the building, and the position where the article receiving device receives the article includes an article port provided on the top of the building configured to dock with the article receiving device.

In some embodiments, the delivery site further includes: a shelter ceiling movably arranged on a top of the building and configured to shelter at least a top of the drone apron at a sheltering position, or leave the sheltering position to expose the drone apron.

In some embodiments, the position where the article receiving device receives the article includes an article port provided on the top of the building configured to dock with the article receiving device, and the shelter ceiling is further configured to shelter the article opening at the sheltering position or to leave the sheltering position to expose the article opening.

In some embodiments, a sliding guide rail is provided between the shelter ceiling and the top of the building, and configured to guide the shelter ceiling to move on the top of the building.

In some embodiments, the article receiving device includes: at least one article platform having an area configured to carry an article; and an article transporting mechanism having an area for carrying an article and movable between each article platform of the at least one article platform and a position where the article unloaded from the drone is received, and configured to receive the article unloaded from the drone on the drone apron and transport the article to the at least one article platform.

In some embodiments, the at least one article platform is arranged below the position where the article unloaded from the drone is received, and the article transporting mechanism includes: a lifter having a lifting platform capable of carrying an article, and configured to carry the article and adjust a height position of the article; and an article moving device arranged on the lifter, on the article platform or in the building, and configured to move the article between the lifting platform and the article platform at a height of the lifting platform.

In some embodiments, the delivery site further includes: an article loading device at least partially arranged in the building, and configured to load the article in the building onto the drone, so that the drone transports the article to a preset destination.

In some embodiments, the article to be loaded on the drone in the building include an empty carton, an abnormal article or an article to be distributed.

In some embodiments, the delivery site further includes an article loading device that shares the at least one article platform and the article transporting mechanism with the article receiving device.

In some embodiments, the article sorting device includes: a track arranged in the building and located between the storage space and the article receiving device; a mobile platform movably running along the track; and a multi-degree-of-freedom robotic arm arranged on the mobile platform, and configured to pick up the article and release the article after moving the article to a target position.

In some embodiments, the article sorting device further includes: an article temporary storage platform having an area configured to carry an article, and arranged on the mobile platform; wherein the multi-degree-of-freedom robotic arm is configured to temporarily store the article received from the article receiving device onto the article temporary storage platform when the mobile platform moves to a position adjacent to the article receiving device, and to sort the article on the article temporary storage platform to corresponding positions of the storage space when the mobile platform moves to a position adjacent to the storage space.

In some embodiments, the delivery site further includes: a distribution interface area configured to provide a parking area on which the distribution vehicle configured to perform article distribution is parked; wherein the article sorting device is further configured to load the article in the storage space onto the distribution vehicle, or to sort the article on the distribution vehicle to the storage space.

In some embodiments, the distribution vehicle is an unmanned ground distribution vehicle, and the distribution interface area is located in the building provided with a passage/door communicating the external with the distribution interface area.

In some embodiments, the delivery site further includes: a second adjusting mechanism arranged in the distribution interface area and configured to adjust a position of the distribution vehicle entering the distribution interface area.

In some embodiments, the second adjusting mechanism includes: a rotary platform rotatable about an axis perpendicular to a horizontal plane, and configured to adjust an angle of the distribution vehicle carried on the rotary platform relative to the article sorting device by rotation.

In some embodiments, there further includes a distribution interface area configured to provide a parking area for the distribution vehicle configured to perform article distribution; wherein the track is also located between the storage space and the distribution interface area.

In some embodiments, the article sorting device further includes: an article temporary storage platform having an article carrying area and arranged on the mobile platform, wherein the multi-degree-of-freedom robotic arm is configured to temporarily store the article to be distributed in the storage space onto the article temporary storage platform when the mobile platform moves to a position adjacent to the storage space, and to load the article on the article temporary storage platform onto the distribution vehicle when the mobile platform moves to a position adjacent to the distribution interface area; or to temporarily store the distribution vehicle onto the article temporary storage platform when the mobile platform moves to a position adjacent to the distribution interface area, and store the article on the article temporary storage platform into the storage space when the mobile platform moves to a position adjacent to the storage space.

In some embodiments, the article sorting device further includes: an article lifting mechanism having a lifting platform capable of carrying an article, arranged on the mobile platform, and configured to lift the article on the article temporary storage platform to a height of a corresponding article entrance of the distribution vehicle, so that the multi-degree-of-freedom robotic arm pushes the article horizontally into the article entrance.

In some embodiments, the delivery site further includes: a client self-picking mechanism having an operation interface and an article self-picking port, and arranged outside the building, wherein the article sorting device is further configured to sort a corresponding article in the storage space to the article self-picking port according to a claiming instruction inputted by the client in the operation interface.

In some embodiments, the delivery site further includes: an automatic vending device having an operation interface and a product exporting port, and arranged outside the building, wherein the article sorting device is further configured to sort a corresponding article in the storage space as a sold article to the product exporting port according to a purchase instruction inputted by the client in the operation interface.

In some embodiments, the delivery site further includes: a client dispatching mechanism having an operation interface and an article placing port, and arranged outside the building; wherein the article sorting device is further configured to sort the article received by the article placing port to a corresponding position in the storage space according to a dispatching instruction inputted by the client in the operation interface.

In some embodiments, the delivery site further includes: a first visual device arranged in the building and configured to recognize the article received by the article receiving device, so that the article sorting device sorts the article.

In some embodiments, the delivery site further includes: a second visual device arranged in the building and configured to recognize a position of the distribution vehicle entering the distribution interface area, so that the second adjusting mechanism adjusts a position of the distribution vehicle according to a recognition result of the second visual device.

In some embodiments, an information display area is provided on an external wall of the building.

In one aspect of the present disclosure, a delivery method based on the foregoing delivery site is provided. The method includes: receiving an article unloaded from a drone on a drone apron by an article receiving device when the drone carrying the article lands on the drone apron; and sorting the article received by the article receiving device into a storage space of the building by an article sorting device.

In some embodiments, the delivery site further includes: loading an empty carton, an abnormal article or an article to be distributed in the building onto the drone, so that the drone transports the article to a preset target position.

In some embodiments, the delivery site further includes: dispatching a distribution vehicle to the delivery site; and picking up the article to be distributed from the storage space and loading the article onto the distribution vehicle by the article sorting device according to a distribution task when the distribution vehicle enters a distribution interface area of the delivery site, so that the distribution vehicle goes to a preset target position to perform the distribution task.

In some embodiments, the delivery site further includes: picking up the article carried by the distribution vehicle and storing the article into the storage space by the article sorting device when the distribution vehicle carrying an article is parked at the distribution interface area of the delivery site.

BRIEF DESCRIPTION OF THE DRAWINGS

The accompanying drawings, which constitute part of this specification, illustrate exemplary embodiments of the present disclosure, and together with this specification, serve to explain the principles of the present disclosure.

The present disclosure may be more clearly understood from the following detailed description with reference to the accompanying drawings, in which.

Figure 1:
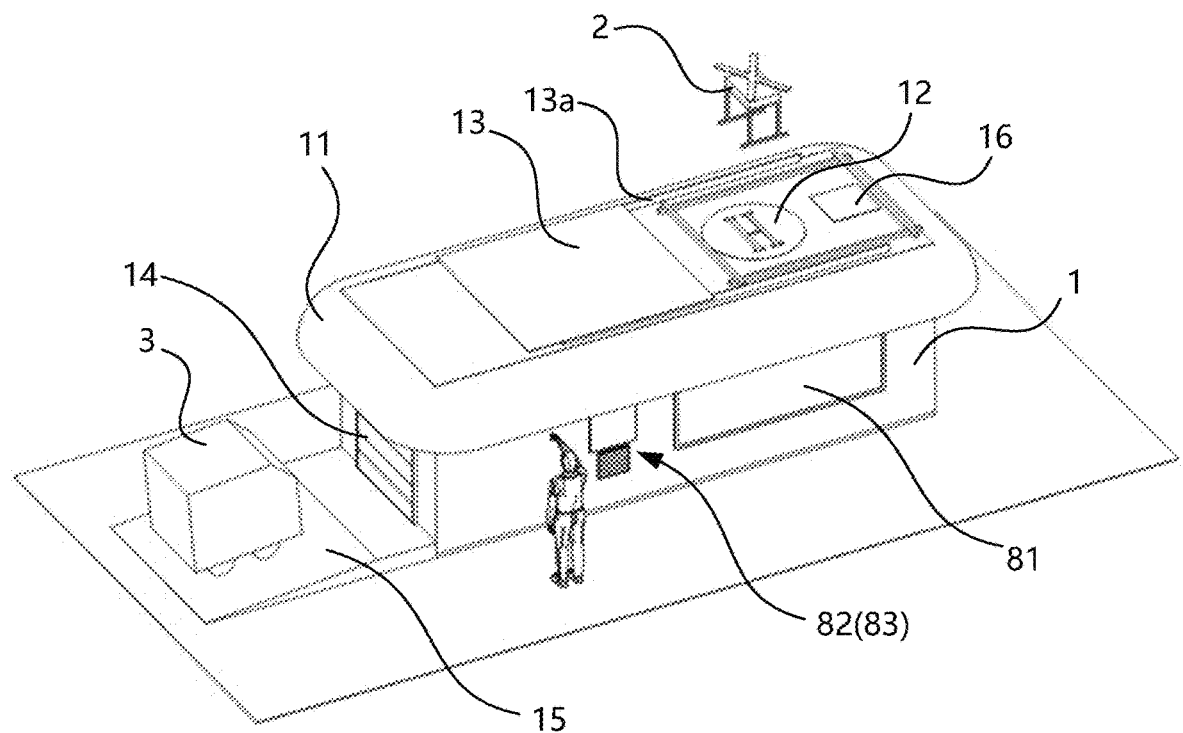
FIG. 1 is a schematic view of an external structure in some embodiments of the delivery site according to the present disclosure.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully transport the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include" or variants thereof means that the element before the word covers the element (s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (including technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The delivery sites in the related art are generally a plurality of network sites established in cities, and each network site is deployed with relevant staff so that labor is responsible for transferring an article or helping clients to pick up an article. After observation and research, it has been found that although there is an application method of using a drone or an unmanned driving vehicle for article distribution in related technologies, such application method still depends on the participation of labor power, which results in high cost and low efficiency. Moreover, whether the distribution of an article is successful or not is restricted by the quality of the operators to a certain extent.

In view of this, the embodiments of the present disclosure provide a delivery site and a delivery method to reduce dependence on labor.

As shown in FIG. 1, it is a schematic view of an external structure in some embodiments of the delivery site according to the present disclosure. Referring to FIGS. 1 and 2 to 4, the delivery site in this embodiment includes: a building 1, an article receiving device 4, and an article sorting device 5. The building 1 has a storage space 6 configured to store an article and a drone apron 12 configured to allow a drone 2 to land thereon. The building 1 may be an unmovable building structure that is fixedly constructed on the ground, a movable mobile building structure, or a combined structure of an unmovable building structure and a mobile building structure.

The article receiving device 4 is at least partially arranged in the building 1 to receive an article unloaded by the drone 2 on the drone apron 12. The drone 2 may park on the drone apron 12, and is configured to unload an article to the delivery site or load an article from the delivery site. Compared with the method of dropping an article from the drone, such unloading method can unload an article more safely and reliably, and it is convenient to implement loading an article by the drone 2.

The article sorting device 5 is arranged in the building 1 to sort the received article into the storage space 6. After the article receiving device 4 receives the article from the drone 2, the article sorting device 5 may sort the article to corresponding positions in the storage space in the building 1. The article here may be packaged article or a carton containing at least one product, and may also be an empty carton or the like.

In this embodiment, the article are transported by drones to the delivery site, such that the article unloaded on the drone apron are received by the article receiving device in the delivery site, and then the received article are sorted to the storage space by the article sorting device. In this way, on one hand, this reduces the manual dependence on labor during transport to the delivery site and loading and unloading an article at the delivery site, and on the other hand, the flexibility of the logistics distribution process is also improved by drones.

Considering that the position of the drone 2 landing on the drone apron 12 might not be very accurate, in some embodiments, a first adjusting mechanism may be provided on the drone apron 12 configured to adjust a position of the drone 2 landing on the drone apron 12. The first adjusting mechanism may also adjust the article unloaded from the drone 2 to a position where the article receiving device 4 receives the article. The first adjusting mechanism may include a pushing plate that is movable transversely along a surface of the drone apron 12, and adjust the drone 2 or the article to an appropriate position by pushing a bottom support frame of the drone 2 or the article. The pushing plate may be driven by an electric motor, a hydraulic cylinder or an air cylinder. In other embodiments, the first adjusting mechanism may also include a mechanical structure that adjusts a position by dragging or hoisting, for example, a boom or the like that performs traction by a traction rope.

In FIG. 1, the drone apron 12 may be located on the top of the building 1. The position where the article receiving device 4 receives the article may include an article port 16 provided on the top of the building 1 for docking with the article receiving device 4. The article port 16 may be located on one side of the drone apron 12 so that the first adjusting mechanism adjusts the article unloaded by the drone 2 to the article port 16.

Referring to FIG. 1, a rain shelter ceiling 11 is provided on one side of the top of the delivery site, which allows pedestrians to take shelter from rain under the rain shelter ceiling 11. A shelter ceiling 13 may also be provided on the top of the delivery site. The shelter ceiling 13 which is movable on the top of the building 1, can shelter a top of the drone apron 12 at a sheltering position, so as to protect the components of the delivery site from erosion and damage by bad weather such as rain, snow, sand and dust. In addition to sheltering the drone apron 12, the shelter ceiling 13 may also be used to shelter the article opening 16 at a sheltering position. In order to use the drone apron 12 normally, the shelter ceiling 13 may expose the drone apron 12 by leaving the sheltering position. The shelter ceiling 13 may also expose the article opening 16 by leaving the sheltering position. The shelter ceiling 13 may be driven by an electric motor, a hydraulic cylinder or an air cylinder.

A sliding guide rail 13a may be provided between the shelter ceiling 13 and the top of the building 1. The sliding guide rail 13a may guide the movement of the shelter ceiling 13 on the top of the building 1. According to requirements, a driving mechanism may also be provided on the shelter ceiling 13 to automatically drive the shelter ceiling 13, for a sliding movement between a sheltering position and a non-sheltering position. In addition, the shelter ceiling 13 may also be used as a standby drone apron, so that some drones may temporarily park on the shelter ceiling 13 when the shelter ceiling 13 cannot be deployed due to a fault or there are a plurality of incoming drones delivering an article at the same time.

Figure 2:
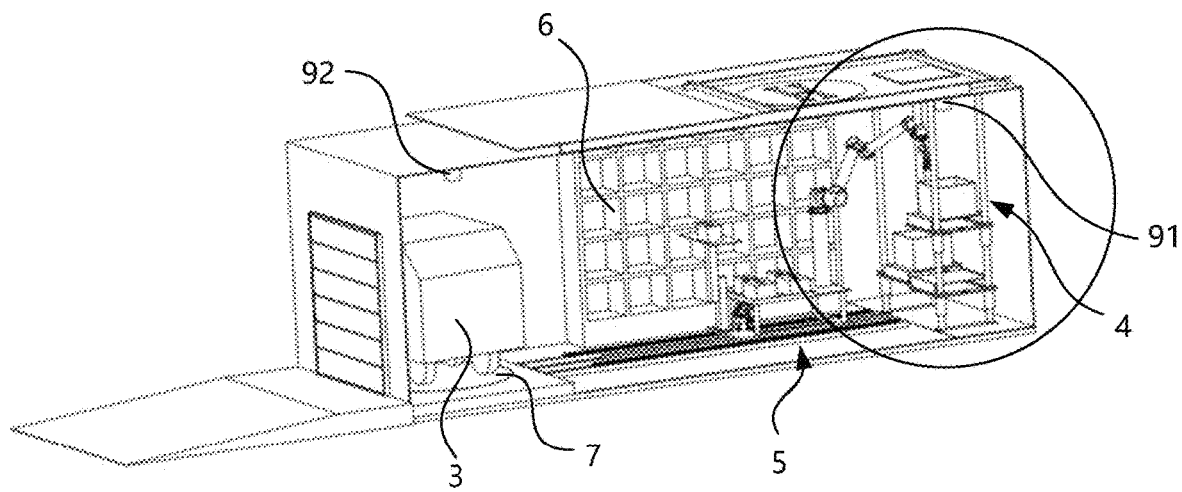
FIG. 2 is a schematic view of an internal structure in some embodiments of the delivery site according to the present disclosure.
Figure 3:
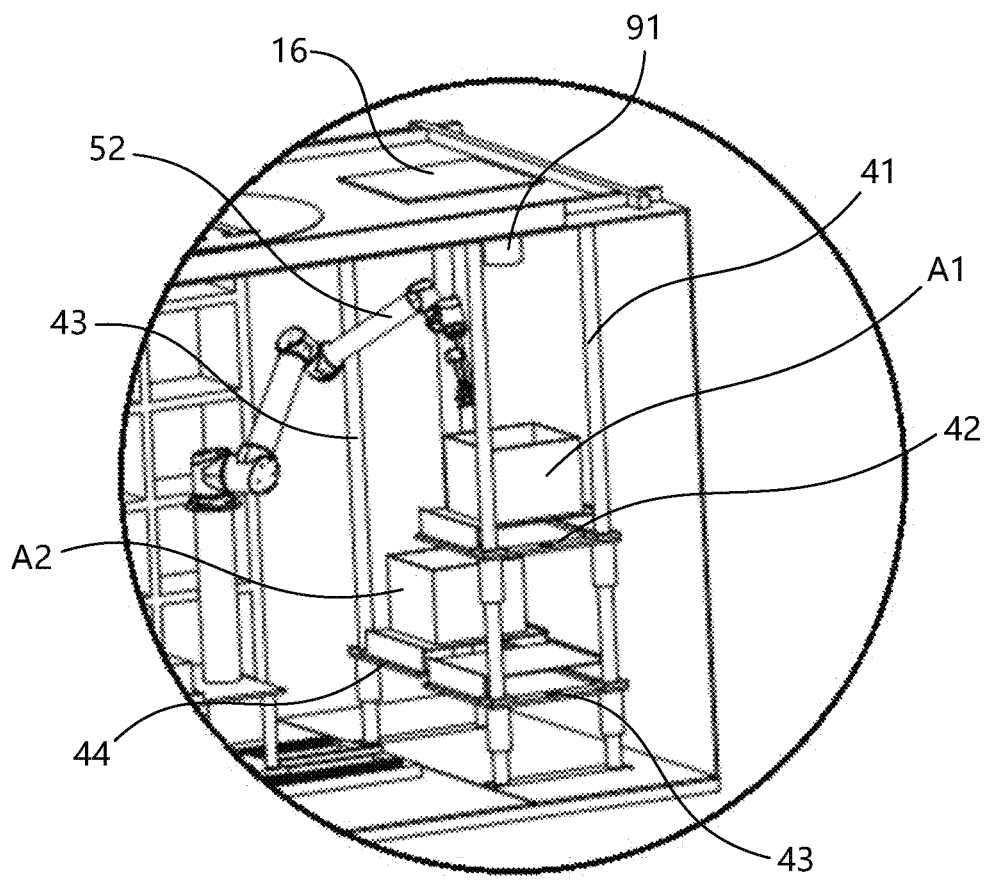
FIG. 3 is an enlarged view of a circled part in FIG. 2.

Referring to FIGS. 2 and 3, in some embodiments, the article receiving device 4 includes: at least one article platform and an article transporting mechanism. FIG. 3 shows article platforms 42 and 43 at different heights. Different article platforms may serve different purposes. For example, an article platform that is higher may serve as a sorting station, and one or more article platforms that are lower may serve as temporary storage locations for an article, an empty carton or an abnormal article. The abnormal article here is an article that do not conform to the order. For example, the article does not conform to the order, including that the article is inconsistent with the article recorded in the order, or inconsistent with the promised or default quality/quantity on the order or the like.

Each article platform and the article transporting mechanism both have an area for carrying the article. The article transporting mechanism moves between each article platform in the at least one article platform and a position where the article unloaded from the drone 2 is received. The article transporting mechanism may receive the article unloaded from the drone 2 on the drone apron 12 and transport the same to the at least one article platform.

The transport path of the article transporting mechanism may be a vertical linear path to reduce a transverse space occupation, and may also be a spiral, zigzag, or the like. For a vertical linear path, at least one article platform may be arranged below a position where the article unloaded from the drone 2 is received. If a plurality of article platforms are included, for example article platforms 42 and 43 in FIG. 3, they may be fixed at different heights below the article port 16 through support pillars 41 respectively.

In FIG. 3, the article transporting mechanism may include: a lifter 44 and an article moving device. The lifter 44 has a lifting platform that may carry the article, for carrying the article and adjusting a height position of the article. The lifting platform of the lifter 44 may be installed on a guide rod 43 that is vertically arranged, and ascends or descends under the drive of a driving mechanism.

The article moving device may be arranged on the lifter 44, for a moving article between the lifting platform and an article platform at a height of the lifting platform. For example, when the lifting platform carries the article to move to a height of a certain article platform, the article may be moved to the article platform through the article moving device on the lifter, such as a belt or a push rod. When an empty lifting platform moves to a certain article platform carrying an article, the article may be moved to the lifting platform through the article moving device on the lifter, such as a belt or a pull rod. In other embodiments, the article moving device may also be arranged on the article platform, or in the building 1, independent of the lifting platform or the article platform.

In addition to receiving the article unloaded from the drone, the delivery site may also transport the article outwards by the drone. For example, the drone transports an empty carton, an abnormal article or an article to be distributed to a preset target position. Correspondingly, in some embodiments, the delivery site may further include an article loading device, which is at least partially arranged in the building 1 for loading the article in the building 1 onto the drone 2, so that the drone 2 transports the article to the preset target position. Here also includes that the drone transfers the article to be distributed in the delivery site to another delivery site or a client's receiving area.

For an empty carton or an abnormal article, the drone 2 may transport them back to the delivering warehouse for a reloading or inspection operation. The article loading device and the article receiving device 4 may share the at least one article platform and the article transporting mechanism. In other embodiments, the article loading device may also be independent of the article receiving device.

Figure 5:
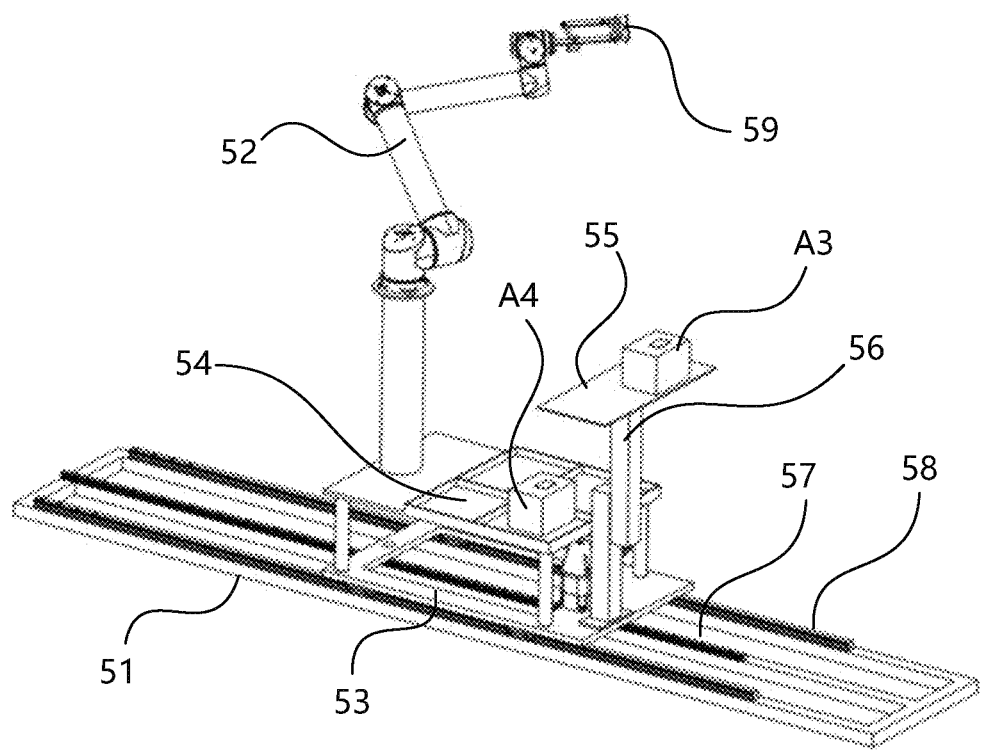
FIG. 5 is a schematic view of a specific structure of an article sorting device in some embodiments of the delivery site according to the present disclosure.

Referring to FIGS. 2 and 5, in some embodiments, the article sorting device 5 may include: a rail 51, a mobile platform 53 and a multi-degree-of-freedom robotic arm 52. The rail 51 may be arranged on a floor or side wall in the building 1. In order to facilitate the operation of the mobile platform 53 between the storage space 6 and the article receiving device 4, the track 51 may be arranged between the storage space 6 and the article receiving device 4. The mobile platform 53 runs movably along the track 51. The multi-degree-of-freedom robotic arm 52 is arranged on the mobile platform 53 for picking up the article and releasing them after moving to a target position. The multi-degree-of-freedom robotic arm 52 may include a plurality of arm sections, wherein an extreme arm section may be provided with an end picker 59.

In FIG. 5, the track 51 may include an underframe, a linear guide rail 58 and a rack 57. The underframe may be fixed on a floor surface of the building, or on a side wall, a top ceiling or an internal facility of the building as required. The linear guide rail 58 is fixed on the underframe, and cooperates with a bottom surface of the mobile platform 53. The rack 57 is fixed on the underframe and can mesh with a gear in a gear driving mechanism provided on the mobile platform 53. In this way, the mobile platform 53 may move along a straight line on the rail 51 under the driving of the gear driving mechanism.

Referring to FIG. 5, in some embodiments, the article sorting device 5 further includes an article temporary storage platform 54. The article temporary storage platform 54 including an area for carrying an article is arranged on the mobile platform 53. The multi-degree-of-freedom robotic arm 52 may be configured to temporarily store the article received from the article receiving device 4 onto the article temporary storage platform 54 when the mobile platform 53 moves to a position adjacent to the article receiving device 4. When the mobile platform 53 moves to a position adjacent to the storage space 6, the multi-degree-of-freedom robotic arm 52 sorts the article on the article temporary storage platform 54 to corresponding positions of the storage space 6.

In order to enable the multi-degree-of-freedom robotic arm 52 to accurately pick up the article, referring to FIGS. 2 and 3, a first visual device 91 may be provided inside the building 1, so that the article received from the article receiving device 4 are recognized by the first visual device 91 to facilitate sorting the article by the article sorting device 5.

Figure 4:
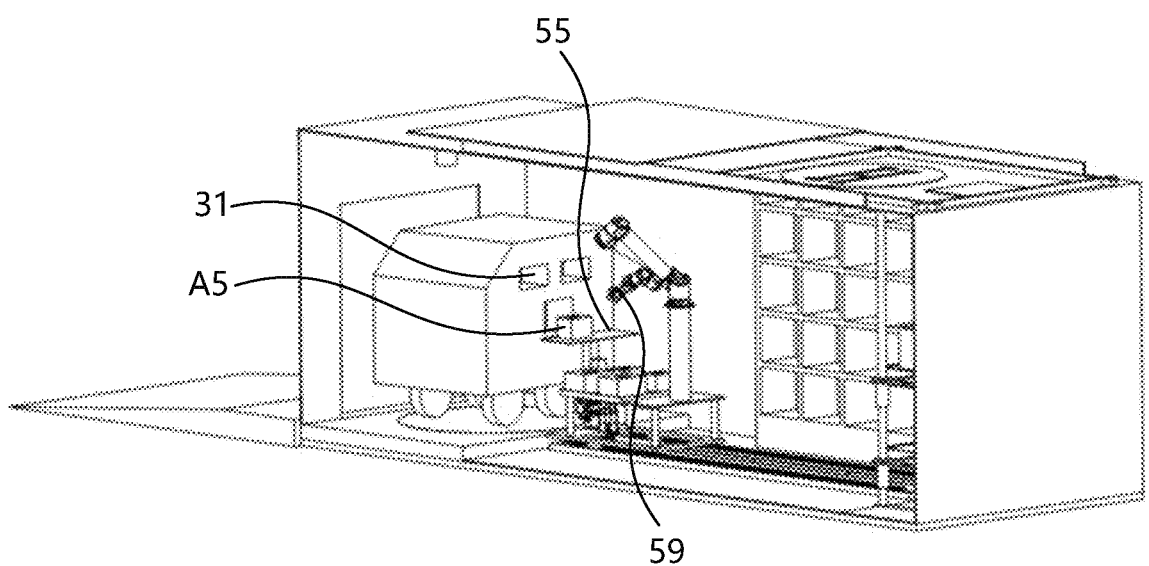
FIG. 4 is a schematic view of loading an article onto a distribution vehicle by an article sorting device in some embodiments of the delivery site according to the present disclosure.

With reference to FIGS. 1-2 and 4, in some embodiments, the delivery site may further include a distribution interface area configured to provide a parking area for the distribution vehicle 3 to perform article distribution. The article sorting device 5 may load the article in the storage space 6 onto the distribution vehicle 3, or sort the article in the distribution vehicle 3 into the storage space 6 when the distribution vehicle 3 is parked in the distribution interface area. The distribution vehicle 3 here may be alternatively an unmanned ground distribution vehicle (such as an unmanned driving vehicle, a remote control trolley, or the like).

The distribution interface area may be located in the building 1, which is provided with a passage/door 14 communicating the external with the distribution interface area. The door 14 may be automatically opened when the distribution vehicle 3 enters into or exits from the delivery site, and closed at other times. The delivery site may include a second adjusting mechanism 7. The second adjusting mechanism 7 may be arranged in the distribution interface area, and configured to adjust a position of the distribution vehicle 3 entering the distribution interface area.

In order to make a more smooth loading process of the distribution vehicle 3, referring to FIG. 2, the delivery site may further include: a second visual device 92 arranged in the building 1 and configured to recognize a position of the distribution vehicle entering the distribution interface area, so that the second adjusting mechanism 7 accurately adjusts a position of the distribution vehicle 3 according to a recognition result of the second visual device 92. In addition, it is also possible to allow the article sorting device 5 to load the article onto the distribution vehicle 3 more accurately.

Referring to FIG. 2, the second adjusting mechanism 7 may include a rotary platform provided on the floor of the distribution interface area. After the distribution vehicle 3 moves onto the rotary platform, the rotary platform may rotate about an axis perpendicular to the horizontal plane, so that the angle of the distribution vehicle 3 on the rotary platform relative to the article sorting device 5 may be adjusted by rotation so as to facilitate loading the article. For example, if a direction of movement of the wheels of the distribution vehicle 3 is different from an orientation of the article entrance 31 provided on the distribution vehicle 3, it is necessary to rotate the distribution vehicle 3 to a specific angle by the rotary platform so that the article entrance 31 faces towards an interior of the building 1, thereby facilitating the article sorting device 5 to load the article to the article entrance 31. When good loading is completed, the rotary platform may rotate the distribution vehicle 3 to a direction that facilitates the wheels to exit from the delivery site. In addition, for a distribution vehicle 3 having a plurality of sides for carrying an article, different sides required to be loaded with an article may also be rotated by the rotary platform to corresponding directions in sequence, thereby allowing a more convenient and automated loading process.

Referring to FIG. 4, the track 51 may also be arranged between the storage space 6 and the distribution interface area. In this way, it facilitates the operation of the mobile platform 53 between the storage space 6 and the distribution interface area. For the process in which the distribution vehicle 3 loads the article from the delivery site and delivers them outwards, the multi-degree-of-freedom robotic arm 52 may be configured to temporarily store the article to be distributed in the storage space 6 onto the article temporary storage platform 54 when the mobile platform 53 moves to a position adjacent to the storage space 6. When the mobile platform 53 moves to a position adjacent to the distribution interface area, the multi-degree-of-freedom robotic 52 may load the article temporarily stored on the article temporary storage platform 54 onto the distribution vehicle 3.

For the process in which the distribution vehicle 3 loads the article and transports them into the delivery site, the multi-degree-of-freedom robotic arm 52 may be configured to temporarily store the distribution vehicle 3 onto the temporary storage platform 54 when the mobile platform 53 moves to a position adjacent to the distribution interface area, and store the article on the temporary storage platform 54 into the storage space 6 when the mobile platform 53 moves to a position adjacent to the storage space 6.

In order to more conveniently load the article onto the distribution vehicle 3, referring to FIGS. 4 and 5, the article sorting device 5 may further include an article lifting mechanism 56. The article lifting mechanism 56 which has a lifting platform 55 capable of carrying an article is arranged on the mobile platform 53. The lifting platform 55 may lift the article on the article temporary storage platform 54 to a height of a corresponding article entrance 31 of the distribution vehicle 3. In this way, the multi-degree-of-freedom robotic arm 52 pushes the article horizontally into the article entrance 31, thereby simplifying the loading process of the article. The article lifting mechanism 56 may also be configured such that the multi-degree-of-freedom robotic arm 52 pushes the article horizontally into article grids of the storage space.

In addition to distribution to a target position or a target client through the distribution vehicle 3, the article stored in the delivery site and received from the drone 2 may also be picked up by the client spontaneously, that is, the client directly obtains an article from the delivery site. Referring to FIG. 1, in some embodiments, the delivery site may further include: a client self-picking mechanism 82. The client self-picking mechanism 82 which has an operation interface and an article self-picking port 16 is arranged outside the building 1. The client may go to a designated delivery site according to a notification received in SMS, WeChat or other forms, and input an article picking instruction into the operation interface according to the notification. The article sorting device 5 may sort a corresponding article in the storage space 6 to the self-picking port 16 according to the article picking instruction inputted by the client in the operation interface. Compared with the existing article self-picking cabinet, only a single or a small number of article self-picking ports 16 are required to realize the self-picking function of a plurality of article stored in the delivery site, thereby saving an area occupied by the client self-picking mechanism 82 on an external wall of the building.

In addition to picking up the article, the client may also purchase products through the delivery site. In some embodiments, referring to FIG. 1, the delivery site may further include: an automatic vending device 83. The automatic vending device 83 which has an operation interface and a product exporting port is arranged outside the building 1. When the client inputs a purchase instruction for a specific product in the operation interface, the article sorting device 5 may sort a corresponding article in the storage space 6 as a sold article to the product exporting port according to the purchase instruction inputted by the client in the operation interface.

In addition, the client may also make a dispatching order through the delivery site. In some embodiments, the delivery site may also include a client dispatching mechanism having an operation interface and an article placing port and arranged outside the building 1. When the client inputs a dispatching instruction for an article brought by the client in the operation interface, the article sorting device 5 may sort the article received by the article placing port to corresponding positions in storage space 6 according to the dispatching instruction inputted by the client in the operation interface. In this way, after that, the article may be loaded on the drone 2 by the article loading device and transported to a preset target position, or the article may be loaded on the distribution vehicle by the article sorting device and transported to a preset target position.

In order to make full use of an external space of the delivery site, an information display area 81 may also be provided on an external wall of the building 1, for displaying static or dynamic advertisements, notices, programs, and the like.

Based on the embodiments of the above-described delivery site of the present disclosure, the present disclosure also provides a corresponding delivery method. For example, in some embodiments, the delivery method includes: receiving the article unloaded from the drone 2 on the drone apron 12 by the article receiving device 4 when the drone 2 carrying an article lands on the drone apron 12; sorting the article received by the article receiving device 4 into the storage space 6 of the building 1 by the article sorting device 5.

Referring to FIG. 1, the drone 2 may transport the article required to be distributed to a designated delivery site via the air according to a distributing instruction of the system. The system may communicate with the delivery site to obtain a storage condition in the delivery site, so as to arrange the drone 2 to distribute the article in time. When the drone 2 goes to the delivery site, it is also possible to communicate with the delivery site so as to confirm whether the delivery site currently possess a parking condition. When the delivery site cannot receive normally (for example, the article receiving device is damaged or the apron is unavailable for parking), the drone 2 may hold on in the air or return.

When the drone 2 transports the article to the drone apron 12 and releases the article, the drone 2 may park on the drone apron 12 or take off again and go to another target position. When the article is unloaded on the drone apron 12, the article port 16 may be opened for receiving. At this time, the lifter 44 of the article transporting mechanism in FIG. 1 may ascend to a height of the article port 16. In order to move the article into the building, the article may be adjusted onto the lifting platform of the lifter 44 by the first adjusting mechanism. Referring to FIG. 3, the lifter 44 descends the lifting platform to a height of a certain article platform 43, and then moves the article A2 onto the article platform by the article moving device.

Where there are an empty carton or an abnormal article in the building 1 that are required to be transported corresponding processing sites, in other embodiments, the delivery method may further include: loading an empty carton, an abnormal article or an article to be distributed in the building 1 onto the drone 2, so that the drone 2 transports the article to a preset target position.

Before loading an empty carton, an abnormal article or an article to be distributed onto the drone 2, the an empty carton, the abnormal article or the article to be distributed (for example, the article A1 in FIG. 3) may be sorted by the article sorting device 5 onto one or some article platforms 42. In this way, the lifter 44 may move the article A1 to the lifting platform by the article moving device after adjusting the lifting platform to a height of the article platform 42. The lifter 44 then ascends the lifting platform to the article port 16, and may adjust the article A1 to a position where it may be loaded by the drone 2 by the first adjusting mechanism, so as to complete the above-described loading process of the article.

For a single piece of article or a carton containing multiple pieces of articles, the article may be recognized by the first visual device 91 arranged in the building 1, so as to obtain information such as the shape, size, and position of the article. After these information is provided to the article sorting device 5, the multi-degree-of-freedom robotic arm 52 in the article sorting device 5 may delicately and accurately pick up a corresponding article according to the obtained information, and sort them directly to corresponding positions in the storage space or temporarily place it onto the article temporary storage platform 54.

By way of the article temporary storage platform 54, the article sorting device 5 may reduce or avoid frequent movement of the mobile platform 53, thereby increasing the service life of its movement mechanisms. The multi-degree-of-freedom robotic arm 52 may pick up one or more article on the article temporary storage platform 54 into article grids of the storage space 6 one by one.

In other embodiments, the delivery method may further include: dispatching the distribution vehicle 3 to the delivery site; picking up the article to be distributed from the storage space 6 and loading them onto the distribution vehicle 3 by the article sorting device 5 according to a distribution task when the distribution vehicle 3 enters the distribution interface area of the delivery site, so that the distribution vehicle 3 goes to a preset target position to perform the distribution task.

For example, the distribution vehicle 3 (for example an unmanned ground distribution vehicle) may go to a corresponding delivery site in time when a distribution task dispatched by the system is received. Upon arrival at the delivery site, the distribution vehicle 3 may communicate with the delivery site so that the delivery site opens the passage/door 14, which allows the distribution vehicle 3 to enter a distribution interface area inside the building 1. The delivery site may also automatically detect or authenticate an incoming distribution vehicle 3 to determine whether it is qualified for access, and open the passage/door 14 after qualification.

After the distribution vehicle 3 is parked in the distribution interface area, the passage/door 14 may be closed in time to prevent access of unauthorized personnel at this occasion. For a delivery site with a second visual device 92, the second visual device 92 may recognize a position of the distribution vehicle 3 entering the distribution interface area. Based on the position information obtained by recognition, the second adjusting mechanism may adjust a position of the distribution vehicle 3, so that the article entrance where the article is loaded is at a convenient position for loading. If the distribution vehicle 3 has a plurality of loading sides, the second adjusting mechanism may adjust a position of the distribution vehicle 3 for multiple times.

The multi-degree-of-freedom robotic arm 52 of the article sorting device 5 may pick up article from the storage space and load them directly onto the distribution vehicle 3. It is also possible to pick up and load a plurality of article in a batch by means of the article temporary storage platform 54. The article sorting device may also be provided with an article lifting mechanism 56, so that the article to be loaded is hoisted by the lifting platform of the article lifting mechanism 56 to a height corresponding to the article entrance 31 of the distribution vehicle 3. In this way, the multi-degree-of-freedom robotic arm 52 may very easily push the article horizontally into the article entrance 31 to implement loading the article.

After the loading of the distribution vehicle 3 is completed, the second adjusting mechanism may adjust a position of the distribution vehicle 3, so that it is in a position convenient for exiting from the delivery site.

The distribution vehicle 3 (for example, an unmanned ground distribution vehicle) may also be configured to perform the process of replenishing an article to the delivery site. That is, in other embodiments, the delivery method may further include: picking up the article carried by the distribution vehicle 3 and storing them in the storage space 6 by the article sorting device 5 when the distribution vehicle 3 carrying an article is parked at the distribution interface area of the delivery site.

When the client goes to the delivery site to self-picking up an article, dispatch an article, or purchase products, the articles or products may be transferred by the article sorting device 5 according to a relevant instruction inputted by the client in the operation interface (for example, an article picking instruction, a dispatching instruction, or a purchase instruction). The article self-picking port, the article placing port and the product exporting port here may share the same port or independently set. Each operation panel may be set independently, and may also incorporate the purposes for a client self-picking mechanism, a client dispatching mechanism, and an automatic vending device. The article sorting device may implement transporting one or more pieces of article or products between the storage space and the article self-picking port, the article placing port or the product exporting port by the multi-degree-of-freedom robotic arm 52 and the article temporary storage platform 54.

A plurality of embodiments in the present description are described in a progressive manner with different focuses respectively. For the same or similar parts between the respective embodiments, cross-reference may be made. For the embodiments of the method, since the method as a whole and the steps involved therein are in a relationship corresponding to the content in the embodiments of the device, such embodiments are described in a relatively simple manner. For the relevant aspects, reference may be made to some of the descriptions of the embodiments of the device.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features may be made without leaving the scope and spirit of the present disclosure. The scope of the present disclosure is defined by the appended claims.

The invention claimed is:

1. A delivery site, comprising:
a building having a storage space configured to store an article and a drone apron configured to allow a drone to land thereon;
an article receiving device at least partially arranged in the building and configured to receive an article unloaded from the drone on the drone apron; and
an article sorting device arranged in the building, and configured to sort the received article into the storage space,
wherein the article sorting device comprises:
a track arranged in the building and located between the storage space and the article receiving device;
a mobile platform movably running along the track; and
a multi-degree-of-freedom robotic arm arranged on the mobile platform, and configured to pick up the article and release the article after moving the article to a target position.

2. The delivery site according to claim 1, further comprising:
a first adjusting mechanism arranged on the drone apron and configured to adjust a position of the drone landing on the drone apron, or to adjust the article unloaded from the drone to a position where the article receiving device receives the article.

3. The delivery site according to claim 1, wherein the drone apron is located on a top of the building, and the position where the article receiving device receives the article comprises an article port provided on the top of the building configured to dock with the article receiving device.

4. The delivery site according to claim 1, further comprising:
a shelter ceiling movably arranged on a top of the building and configured to shelter at least a top of the drone apron at a sheltering position, or leave the sheltering position to expose the drone apron.

5. The delivery site according to claim 4, wherein the position where the article receiving device receives the article comprises an article port provided on the top of the building configured to dock with the article receiving device, and the shelter ceiling is further configured to shelter the article opening at the sheltering position or to leave the sheltering position to expose the article opening.

6. The delivery site according to claim 4, wherein a sliding guide rail is provided between the shelter ceiling and the top of the building, and configured to guide the shelter ceiling to move on the top of the building.

7. The delivery site according to claim 1, wherein the article receiving device comprises:
at least one article platform having an area configured to carry an article; and
an article transporting mechanism having an area configured to carry an article and movable between each article platform of the at least one article platform and a position where the article unloaded from the drone is received, and configured to receive the article unloaded from the drone on the drone apron and transport the article to the at least one article platform.

8. The delivery site according to claim 7, wherein the at least one article platform is arranged below the position where the article unloaded from the drone is received, and the article transporting mechanism comprises:

a lifter having a lifting platform capable of carrying an article, and configured to carry the article and adjust a height position of the article; and an article moving device arranged on the lifter, on the article platform or in the building, and configured to move the article between the lifting platform and the article platform at a height of the lifting platform.

9. The delivery site according to claim 1, wherein the article sorting device further comprises:

an article temporary storage platform having an area configured to carry an article, and arranged on the mobile platform, wherein the multi-degree-of-freedom robotic arm is configured to temporarily store the article received from the article receiving device onto the article temporary storage platform when the mobile platform moves to a position adjacent to the article receiving device, and to sort the article on the article temporary storage platform to corresponding positions of the storage space when the mobile platform moves to a position adjacent to the storage space.

10. The delivery site according to claim 1, further comprising a distribution interface area configured to provide a parking area for the distribution vehicle configured to perform article distribution, wherein the track is also located between the storage space and the distribution interface area.

11. The delivery site according to claim 10, wherein the article sorting device further comprises:

an article temporary storage platform having an article carrying area and arranged on the mobile platform, wherein the multi-degree-of-freedom robotic arm is configured to temporarily store the article to be distributed in the storage space onto the article temporary storage platform when the mobile platform moves to a position adjacent to the storage space, and to load the article on the article temporary storage platform onto the distribution vehicle when the mobile platform moves to a position adjacent to the distribution interface area; or to temporarily store the distribution vehicle onto the article temporary storage platform when the mobile platform moves to a position adjacent to the distribution interface area, and store the article on the article temporary storage platform into the storage space when the mobile platform moves to a position adjacent to the storage space.

12. The delivery site according to claim 11, wherein the article sorting device further comprises:

an article lifting mechanism having a lifting platform capable of carrying an article, arranged on the mobile platform, and configured to lift the article on the article temporary storage platform to a height of a corresponding article entrance of the distribution vehicle, so that the multi-degree-of-freedom robotic arm pushes the article horizontally into the article entrance.

13. The delivery site according to claim 1, further comprising:

a client self-picking mechanism having an operation interface and an article self-picking port, and arranged outside the building, wherein the article sorting device is further configured to sort a corresponding article in the storage space to the article self-picking port according to an article picking instruction inputted by the client in the operation interface.

14. The delivery site according to claim 1, further comprising:

an automatic vending device having an operation interface and a product exporting port, and arranged outside the building, wherein the article sorting device is further configured to sort a corresponding article in the storage space as a sold article to the product exporting port according to a purchase instruction inputted by the client in the operation interface.

15. The delivery site according to claim 1, further comprising:

a first visual device arranged in the building and configured to recognize the article received by the article receiving device, so that the article sorting device sorts the article.

16. A delivery method based on the delivery site according to claim 1, comprising:

receiving an article unloaded from a drone on a drone apron by an article receiving device when the drone carrying the article lands on the drone apron; and sorting the article received by the article receiving device into a storage space of the building by an article sorting device.

17. The delivery method according to claim 16, further comprising:

loading an empty carton, an abnormal article or an article to be distributed in the building onto the drone, so that the drone transports the article to a preset target position.

18. The delivery method according to claim 16, further comprising:

dispatching a distribution vehicle to the delivery site; and picking up the article to be distributed from the storage space and loading the article onto the distribution vehicle by the article sorting device according to a distribution task when the distribution vehicle enters a distribution interface area of the delivery site, so that the distribution vehicle goes to a preset target position to perform the distribution task.

19. The delivery method according to claim 16, further comprising:

picking up the article carried by a distribution vehicle and storing the article into the storage space by the article sorting device when the distribution vehicle carrying an article is parked at the distribution interface area of the delivery site.

* * * * *